US011390703B2

(12) United States Patent
Ren et al.

(10) Patent No.: US 11,390,703 B2
(45) Date of Patent: Jul. 19, 2022

(54) IODINE TRANSFER POLYMERIZATION METHOD AND COMPOSITIONS THEREFROM

(71) Applicants: Dow Global Technologies LLC, Midland, MI (US); Rohm and Haas Company, Collegeville, PA (US); The Regents of the University of California, Oakland, CA (US)

(72) Inventors: Jing Ming Ren, Hockessin, DE (US); Craig Hawker, Santa Barbara, CA (US); Johannes Willenbacher, Ludwigshafen am Rhein (DE); Alaina McGrath, Santa Barbara, CA (US); Benjaporn Narupai, Goleta, CA (US); David Laitar, Midland, MI (US); Antony Van Dyk, Blue Bell, PA (US)

(73) Assignees: DOW GLOBAL TECHNOLOGIES LLC, Midland, MI (US); ROHM AND HAAS COMPANY, Collegeville, PA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/426,476

(22) PCT Filed: Feb. 7, 2020

(86) PCT No.: PCT/US2020/017175
§ 371 (c)(1),
(2) Date: Jul. 28, 2021

(87) PCT Pub. No.: WO2020/167599
PCT Pub. Date: Aug. 20, 2020

(65) Prior Publication Data
US 2022/0106423 A1   Apr. 7, 2022

Related U.S. Application Data

(60) Provisional application No. 62/803,627, filed on Feb. 11, 2019.

(51) Int. Cl.
*C08F 220/06* (2006.01)
*C08F 120/06* (2006.01)

(52) U.S. Cl.
CPC .......... *C08F 220/06* (2013.01); *C08F 120/06* (2013.01); *C08F 2410/01* (2013.01); *C08F 2438/00* (2013.01)

(58) Field of Classification Search
CPC .......... C08F 4/08; C08F 2438/00; C08F 2/00; C08F 4/00; C08F 120/06; C08F 220/06; B01J 27/138
See application file for complete search history.

(56) References Cited

U.S. PATENT DOCUMENTS

| | | |
|---|---|---|
| 2,289,540 A | 7/1942 | Dittmar et al. |
| 2,789,099 A | 4/1957 | Rife et al. |
| 3,509,114 A | 4/1970 | Ballast |
| 3,945,843 A | 3/1976 | Holty et al. |
| 3,983,187 A | 9/1976 | Moczygemba et al. |
| 4,055,713 A | 10/1977 | Moczygemba et al. |
| 4,158,678 A | 6/1979 | Tatemoto et al. |
| 4,314,044 A | 2/1982 | Hughes et al. |
| 4,622,425 A | 11/1986 | Gagne et al. |
| 5,077,361 A | 12/1991 | Hughes et al. |
| 5,223,590 A | 6/1993 | Hughes et al. |
| 5,294,686 A | 3/1994 | Fiarman et al. |
| 5,891,972 A | 4/1999 | Egraz et al. |
| 6,143,848 A | 11/2000 | Lee et al. |
| 6,335,404 B1 | 1/2002 | Kirk et al. |
| 2002/0115798 A1 | 8/2002 | Narayan-Sarathy et al. |
| 2005/0171312 A1 | 8/2005 | Lacroix-Desmazes et al. |
| 2006/0111534 A1 | 5/2006 | Suau et al. |
| 2007/0179262 A1 | 8/2007 | Suau et al. |
| 2010/0105832 A1 | 4/2010 | Csihony et al. |

(Continued)

FOREIGN PATENT DOCUMENTS

| | | |
|---|---|---|
| EP | 0489370 A1 | 6/1992 |
| WO | 02070571 A1 | 9/2002 |

(Continued)

OTHER PUBLICATIONS

Boyer et al; "Reverse Iodine Transfer Polymerization (RITP) of Methacrylate"; Macromolecules; vol. 39; 2006; pp. 4044-4053.
Couvreur et al.; "First Nitroxide-Mediated Controlled Free-Radical Polymerization of Acrylic Acid"; Macromolecules; vol. 36; 2003; pp. 8260-8267.
Discekici et al.; "Aqueous Reverse Iodine Transfer Polymerization of Acrylic Acid"; Journal of Polymer Science; vol. 57; 2019; pp. 1877-1881.
Goto et al.; "Reversible Chain Transfer Catalyzed Polymerization (RTCP) with Carbon Catalysts"; Institute for Chemical Research; pp. 1-2.

(Continued)

*Primary Examiner* — Robert D Harlan
(74) *Attorney, Agent, or Firm* — Cantor Colburn LLP

(57) ABSTRACT

Iodine transfer radical polymerization of an ethylenically unsaturated monomer comprising (meth)acrylic acid, salt thereof, or combination thereof, in the presence of a radical polymerization initiator, an organoiodide, and a solvent, is a useful method for making (meth)acrylic acid polymers. The amounts of components utilized can be 2 to 100 equivalents of acrylic acid and 2 to 100 equivalents of sodium acrylate, both dissolved in water to form a 15 to 50 weight percent solution, based on the total weight of the acrylic acid, sodium acrylate, and water; 0.05 to 1 equivalent of an azo polymerization initiator, 1 equivalent of an organoiodide; and 0 to 3 equivalents of an iodide salt. (Meth)acrylic acid polymer solutions are made by these methods. The (meth) acrylic polymers are useful as dispersants.

16 Claims, 4 Drawing Sheets

(56) References Cited

U.S. PATENT DOCUMENTS

| | | | |
|---|---|---|---|
| 2012/0157596 A1 | 6/2012 | Da Silva et al. | |
| 2012/0202937 A1 | 8/2012 | Urtel et al. | |
| 2012/0220707 A1 | 8/2012 | Dungworth et al. | |
| 2016/0347872 A1* | 12/2016 | Goto .......................... | C08F 4/04 |

FOREIGN PATENT DOCUMENTS

| | | |
|---|---|---|
| WO | 03097704 A1 | 11/2003 |
| WO | 03097705 A1 | 11/2003 |
| WO | 2004009644 A2 | 1/2004 |
| WO | 2004009648 A2 | 1/2004 |
| WO | 2004094356 A1 | 11/2004 |
| WO | 2006024706 A1 | 3/2006 |
| WO | 2012083196 A2 | 6/2012 |
| WO | 2018180547 A1 | 10/2018 |

OTHER PUBLICATIONS

Goto et al.; "Reversible Generation of a Carbon-Centered Radical from Alkyl Iodide Using Organic Salts and Their Application as Organic Catalysts in Living Radical Polymerization"; American Chemical Society; vol. 135; 2013; pp. 11131-11139.

International Preliminary Report on Patentability; International Application No. PCT/US2020/017178; International Filing Date: Jun. 4, 2020; dated Jun. 1, 2021; 6 pages.

International Preliminary Report on Patentability; International Application No. PCT/US2020/017178; International Filing Date: Jun. 4, 2020; dated May 4, 2021; 5 pages.

International Search Report; International Application No. PCT/US2020/017175; International Filing Date: Feb. 7, 2020; Date of Mailing: May 29, 2020; 6 pages.

International Search Report; International Application No. PCT/US2020/017178; International Filing Date: Jun. 4, 2020; dated Jun. 4, 2020; 32 pages.

Iovu et al.:"Controlled/Living Radical Polymerization of Vinyl Acetate by Degenerative Transfer with Alkyl Iodides" Macromolecules; vol. 36; 2003; pp. 9346-9354.

Lacroix-Desmazes et al.;"Reversible Iodine Transfer Polymerization of Methyl Acrylate and n-Butyl Acrylate" Macromolecules; vol. 38; 2005; pp. 6299-6309.

Lai et al.;"Functional Polymers from Novel Carboxyl-Terminated Trithiocarbonates as Highly Efficient RAFT Agents"; Macromolecules; American Chemical Society; vol. 35, No. 18; 2002; pp. 6754-6756.

Liu et al.; "Straightforward catalyst/solvent-free iodine-meditated living radical polymerization of functional monomers diriven by visible light irradiation"; Chemical Communication; vol. 52; 2016; pp. 10850-10853.

Loiseau et al.; "Synthesis and Characterizatipon of Poly(acrylic acid) Produced by RAFT Polymerization Application as a Very Efficient Dispersant of CaCO3 Kaolin and TiO2"; Macromolecules; vol. 36; 2003; pp. 3066-3077.

Matyjaszewski et al.; "Controlled Radical Polymerizations: The Use of Alkyl Iodides in Degenerative Transfer"; Macromolecules; vol. 28; 1995; pp. 2093-2095.

Matyjaszewski; "Controlled Radical Polymerization; State of the Art in 2008"; American Chemical Society; Chapter 1, 2009, pp. 1-13.

Millard et al.; "RAFT Polymerization of N-Isopropylacrylamide and Acrylic Acid under y-Irradiation in Aqueous Media"; Macromolecular Rapid Communications; vol. 27; 2006; pp. 821-828.

Muthukrishnan et al. "Ambient Temperature RAFT Polymerization of Acrylic Acid with Ultraviolet Radiation in Aqueous Solution"; Macromolecules; vol. 40; pp. 2978-2980.

Narupai et al.; "Low-Temperature, Rapid Copolymerization of Acrylic Acid and Sodium Acrylate in Water"; Polymer Chemistry; vol. 57, Issue 13, 2019, pp. 1-9.

Peng et al.;"Organocobalt Mediated Radical Polymerization of Acrylic Acid in Water"; Macromolecules; vol. 40; 2007; pp. 6814-6819.

Romack et al.; "Precipitation Polymerization of Acrylic Acid in Supercritical Carbon Dioxide"; Macromolecules; vol. 28; 1995; pp. 912-915.

Sarkar et al.;"Living Radical Polymerization with Alkali and Alkaline Earth Metal Iodides as Catalysts" Macromolecules; ACS Publications; vol. 49; 2016; pp. 5033-5042.

Tonnar et al."Use of Sodium Iodide as the Precursor to the Control Agent in Ab Initio Emulsion Polymerization"; Angew. Chem. Int. Ed.; vol. 47; 2008; pp. 1294-1297.

Tonnar et al."Use of Sodium Iodide as the Precursor to the Control Agent in Ab Initio Emulsion Polymerization"; Angew. Chem. Int. Ed.; vol. 47; 2008; pp. 1314-1317.

Tonnar et al.;"Controlled Radical Ab Initio Emulsion Polymerization of n-Butyl Acrylate by Reverse Iodine Transfer Polymerization (RITP): Effect of the Hydrolytic Disproportionation of Iodine"; Macromolecules Rapid Comm; vol. 27 2006; pp. 1733-1738.

Tonnar et al.;"Controlled Radical Polymerization of Styrene by Reverse Iodine Transfer Polymerization (RITP) in Miniemulsion: Use of Hydrogen Peroxide as Oxidant"; Macromolecules; vol. 40; 2007; pp. 186-190.

Tonnar et al.;"Living Radical ab Initio Emulsion Polymerization of n-Butyl Acrylate by Reverse Iodine Transfer Polymerization (RITP): Use of Persulfate as Both Initiator and Oxidant"; Macromolecules; vol. 40; 2007; pp. 6076-6081.

Wang et al.;"Solvent-Selective Reactions of Alkyl Iodide with Sodium Azide for Radical Generation and Azide Substitution and Their Application to One-Pot Synthesis of Chain-End-Functionalized Polymers"; Journal of the ACS; vol. 139; 2017; pp. 10551-10560.

Wolpers et al.:"UV Light as External Switch and Boost of Molar-Mass Control in Iodine-Mediated Polymerization" Macromolecules; vol. 47; 2014; pp. 954-963.

Wolpers; "Advances in chain-growth control and analysis of polymer"; Gottengen; 2014; pp. 4-276.

Written Opinion; International Application No. PCT/US2020/017175; International Filing Date: Feb. 7, 2020; dated May 29, 2020; 7 pages.

Written Opinion; International Application No. PCT/US2020/017178; International Filing Date: Jun. 4, 2020; dated Jun. 4, 2020; 6 pages.

Xiao et al.;Organocatalyzed Living Radical Polymerization via in Situ Halogen Exchange of Alkyl Bromides to Alkyl Iodides; Macromolecules; vol. 50; pp. 1882-1891.

* cited by examiner

IODINE TRANSFER POLYMERIZATION METHOD AND COMPOSITIONS THEREFROM

CROSS REFERENCE TO RELATED APPLICATIONS

This application is a National Stage application of PCT/US2020/017175, filed Feb. 7, 2021, which claims the benefit of U.S. Provisional Application No. 62/803,627, filed Feb. 11, 2019, both of which are incorporated by reference in their entirety herein.

BACKGROUND

Low number average molar mass ($M_n$) (meth)acrylic acid polymers, such as poly(acrylic acid) (PAA), poly(methacrylic acid) (PMAA), and salts thereof, are commercially useful as dispersants. However, the controlled synthesis of PAA and PMAA with targeted molecular weight is difficult, especially for polymers with $M_n$ below 20 kilograms per mole (kg/mol). Although there are methods for preparing low $M_n$ PAA and PMAA with narrow molecular weight distribution, or molar mass dispersit (Đ), expensive chain transfer agents (CTA) and complex processes or equipment are often required, which results in a high cost for PAA or PMAA produced by these methods.

Molecular iodine ($I_2$) and organic iodides have been used as chain transfer agents in the polymerization of various ethylenically unsaturated monomers in a method that has become known as iodine transfer polymerization (ITP). For example, molecular iodine ($I_2$) and iodoform were used as CTAs in suspension polymerization of acrylonitrile and styrene (U.S. Pat. No. 3,983,187). ITP has been used for the preparation of block copolymers of α-olefins and (meth) acrylates or acrylonitrile (European Publication No. 0489370). However, the CTAs were expensive iodo-fluoro compounds. ITP has been used for the preparation of fluorinated polymers (U.S. Pat. No. 4,158,678). However, the CTA served a dual purpose as CTA and iodo-fluoro monomer. ITP has been used for polymerization of α-fluoroacrylate esters (International Publication No. WO2003097705), and vinyl chloride (International Publication No. WO2003097704). However, ITP of (meth)acrylic acid has not been demonstrated. Although ITP has been used for polymerization of (meth)acrylate ester monomers (International Publication Nos. WO2004009644, WO2004009648), ITP of (meth)acrylic acid was not demonstrated, the CTA was 12 or p-toluenesulfonyl iodide, and organic solvents were used.

Due to their commercial importance, it is desirable to have a polymerization method to produce PAA and PMAA of controlled number average molar mass ($M_n$) and narrow molecular weight distribution (low molar mass dispersity, Đ), with high conversion. It is also desirable that the method does not use transition metal catalysts, or expensive CTAs, such as cobalt complexes, nitroxides, dithioesters, thiocarbamates, xanthates, iodine ($I_2$), or p-toluenesulfonyl iodide. It is also desirable that, unlike the above methods, the polymerization method does not require organic solvents, and can be conducted in water instead.

BRIEF DESCRIPTION

A method for making a (meth)acrylic acid polymer comprises iodine transfer radical polymerization of an ethylenically unsaturated monomer comprising (meth)acrylic acid, salt thereof, or combination thereof, in the presence of a radical polymerization initiator, an organoiodide, and a solvent. The method of making the (meth)acrylic acid polymer can comprise iodine transfer polymerization of 2 to 100 equivalents of acrylic acid and 2 to 100 equivalents of sodium acrylate, both dissolved in water to form a 15 to 50 weight percent solution, based on the total weight of the acrylic acid, sodium acrylate, and water, in the presence of: 0.05 to 1 equivalent of an azo polymerization initiator; 1 equivalent of an organoiodide; and 0 to 3 equivalents of an iodide salt. (Meth)acrylic acid polymer solutions are made by these methods.

BRIEF DESCRIPTION OF THE DRAWINGS

Referring now to the drawings.

DETAILED DESCRIPTION

Figure 1:
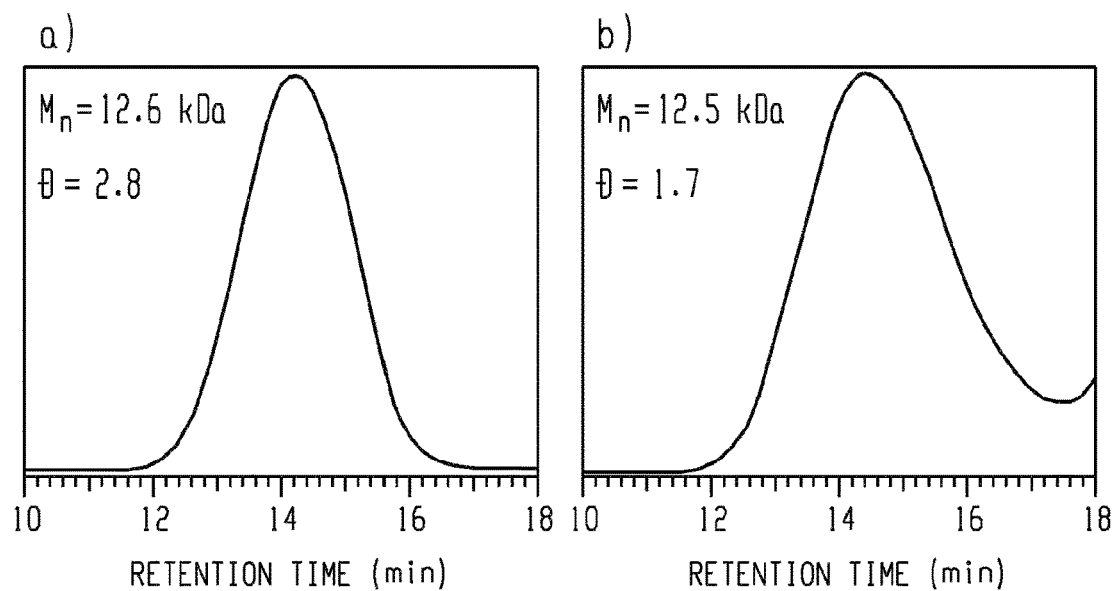
FIG. 1 depicts SEC traces of P(AA-co-NaA) from Ex. 1: a) the aqueous SEC trace after purification via dialysis in which $M_n$ and Đ were calculated based on PAA standards; and b) the chloroform SEC trace of P(AA-co-NaA) from Ex. 1 after methylation, with $M_n$ and Đ calculated based on PMMA standards.

The present inventors have developed a method for making a (meth)acrylic acid polymer, comprising iodine transfer radical polymerization of an ethylenically unsaturated monomer comprising (meth)acrylic acid, salt thereof, or combination thereof, in the presence of a radical polymerization initiator, an organoiodide, and a solvent. This polymerization method produces (meth)acrylic acid polymers of controlled number average molar mass ($M_n$) and narrow molecular weight distribution (low molar mass dispersity, Đ), with high conversion. This polymerization method utilizes an organoiodide as molar mass regulator, instead of less desirable chain transfer agents, such as heavy metals, nitroxides, dithioesters, thiocarbamates, xanthates, $I_2$, and p-toluenesulfonyl iodide. A further benefit is that this method can be conducted in the absence of organic solvents using water as the solvent.

The ethylenically unsaturated monomer can be a combination of (meth)acrylic acid and salt thereof. For example, the ethylenically unsaturated monomer can be a combination of acrylic acid and sodium acrylate or a combination of methacrylic acid and sodium methacrylate. Although it is not necessary to use a combination of (meth)acrylic acid and salt thereof, the combination was found to provide good control of $M_n$, as illustrated by the present examples. Any inorganic or organic cation can be used as the counterion in the salts. For example, the salt can be an alkali metal salt, an alkaline earth metal salt, an ammonium salt, a quaternary ammonium salt, or a combination comprising at least one of the foregoing salts. In some embodiments, the cation is sodium, potassium, or ammonium, for example sodium.

In addition to acrylic acid, methacrylic acid, or salts thereof, the ethylenically unsaturated monomer can further comprise one or more other (meth)acrylic or vinyl monomers. The other ethylenically unsaturated monomer can be another ionic monomer. For example, the other ethylenically unsaturated monomer can be another carboxylic acid-functional monomer, such as crotonic acid, itaconic acid, an itaconic acid monoester, fumaric acid, a fumaric acid monoester, maleic acid, a maleic acid monoester, or a combination comprising at least one of the foregoing carboxylic acid monomers. The other ethylenically unsaturated monomer can also be a carboxylic acid anhydride-functional monomer, in which the carboxylic acid anhydride functionality can be converted to carboxylic acid functionality, for example maleic anhydride or itaconic anhydride.

The other ethylenically unsaturated monomer can also be an ionic monomer comprising a sulfonic acid-functional monomer, a phosphoric acid-functional monomer, a phosphonic acid-functional monomer, or a salt thereof. Examples of sulfonic acid-functional monomers include 2-sulfoethyl (meth)acrylate, 3-sulfopropyl (meth)acrylate, styrene sulfonic acid, vinyl sulfonic acid, and 2-(meth)acrylamide-2-methyl propanesulfonic acid. Examples of phosphoric acid-functional monomers include 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. The phosphoric acid-functional monomer can also be a phosphoric acid ester of an alkoxylated hydroxyalkyl (meth)acrylate, for example a hydroxyethyl or hydroxypropyl (meth)acrylate ethoxylate or propoxylate having 1 to 50 ethoxy or propoxy repeat units. The ionic monomer can also be a cationic monomer, for example 2-(N,N-dimethylamino)ethyl (meth)acrylate.

The other ethylenically unsaturated monomer can also be a nonionic monomer. The nonionic monomer can be a hydrophilic nonionic ethylenically unsaturated monomer, for example hydroxyethyl (meth)acrylate, hydroxypropyl (meth)acrylate, polyethylene glycol (meth)acrylate, or (meth)acrylamide. The hydrophilic nonionic monomer can also be an alkoxylated hydroxyalkyl (meth)acrylate, for example a hydroxyethyl or hydroxypropyl (meth)acrylate ethoxylate or propoxylate having 1 to 50 ethoxy or propoxy repeat units. The nonionic monomer can also be a hydrophobic non-ionic monomer, for example an alkyl ester of (meth)acrylic acid, such as methyl (meth)acrylate, ethyl (meth)acrylate, butyl (meth)acrylate, 2-ethylhexyl (meth) acrylate, decyl (meth)acrylate, isodecyl (meth)acrylate, or lauryl (meth)acrylate. The nonionic monomer can also be styrene, or a substituted styrene such as α-methyl styrene, ethylene, an α-olefin such as propylene, 1-butene, 1-hexene, 1-octene, 1-decene, isobutylene, or diisobutylene, or butadiene. The nonionic monomer can also be a vinyl monomer, such as acrylonitrile, vinyl chloride, vinyl acetate, vinyl butyrate, or a vinyl ester of a branched, tertiary-alkyl alcohol, sold under the tradename VeoVa™, for example VeoVa™ 9 Monomer, VeoVa™ 10 Monomer, or VeoVa™ 11 Monomer, available from Momentive Specialty Chemicals.

The amount of ethylenically unsaturated monomer comprising (meth)acrylic acid or salt thereof can be 1 to 500 equivalents, based on the moles of organoiodide. Within this range, the amount of ethylenically unsaturated can be greater than or equal to 2, 4, 6, or 8 equivalents and less than or equal to 400, 300, 200, 100, or 90 equivalents. In some embodiments, the amount of ethylenically unsaturated monomer is 4 to 200 equivalents, or 8 to 90 equivalents, based on the moles of organoiodide. When the ethylenically unsaturated monomer comprises a combination of (meth) acrylic acid and (meth)acrylate salt, the amount of each can be, independently, 1 to 250 equivalents, based on the moles of organoiodide. Within this range, the amount of (meth) acrylic acid and (meth)acrylic acid salt can be each, independently, greater than or equal to 2, 3, or 4 equivalents and less than or equal to 250, 200, 150, 100, 50, or 45 equivalents. In some embodiments, the amount of (meth)acrylic acid and (meth)acrylic acid each, is independently 2 to 100 equivalents, or 4 to 45 equivalents, based on the moles of organoiodide.

The iodine transfer polymerization is conducted in the presence of a radical polymerization initiator. Any thermally unstable compound that generates reactive free radicals can serve as the radical polymerization initiator. In some embodiments, the radical polymerization initiator is an azo polymerization initiator. Azo polymerization initiators are azo compounds substituted with tertiary alkyl groups, and are characterized by their 10-hour half-life temperature, i.e. the temperature at which half of the azo compound decomposes in 10 h. Azo compounds are commercially available from Wako Chemicals USA, Richmond, Va. The azo polymerization initiator can be oil-soluble or water-soluble. The azo polymerization initiator can be, for example, an azo nitrile, such as 2,2'-azobis(2-methylpropionitrile) (AIBN, 10-hour half-life temperature of 65° C., oil-soluble) or 2,2'-azobis(4-methoxy-2,4-dimethylvaleronitrile) (V70, 10-hour half-life temperature of 30° C., oil-soluble), or 4,4'-azobis(4-cyanopentanoic acid) (V501, 10-hour half-life temperature of 69° C., water-soluble). The azo polymerization initiator can also be an azo amide, such as VA086, or an azo imidazoline, such as V061 or V044.

The radical polymerization initiator can also be an inorganic or organic peroxide. The peroxide can be, for example, hydrogen peroxide, an alkali metal peroxide, such as sodium or potassium peroxide, a tert-alkyl hydroperoxide, such as cumene hydroperoxide or tert-butyl hydroperoxide, a tert-alkyl peroxide, such as dicumyl peroxide or di-tert-butyl hydroperoxide, a tert-alkyl perester wherein the tert-alkyl group has at least 5 carbon atoms, such as tert-amyl peroxybenzoate, ammonium and/or alkali metal persulfates, such as ammonium persulfate, sodium persulfate, or potassium persulfate, sodium perborate, peroxyphosphoric acid and salts thereof, peroxymonosulfuric acid and salts thereof, or potassium permanganate. In some embodiments, the peroxide polymerization initiator is sodium persulfate. The amount of radical polymerization initiator used in the method can be 0.05 to 1.0 equivalent, based on the amount of organoiodide. With this range, the amount or radical polymerization initiator can be greater than or equal to 0.1, 0.15, or 0.2 equivalent and less than or equal to 0.3, 0.4, or 0.5 equivalent. In some embodiments, the amount of radical polymerization initiator can be 0.1 to 0.5 equivalent, or 0.2 to 0.3 equivalent.

The iodine transfer polymerization is conducted in the presence of an organoiodide, which serves as a molar mass control agent. As used herein, an organoiodide is a compound having a C—I bond. Any organic iodide having the required reactivity in controlling $M_n$ and Đ can be used. The organoiodide can be, for example, a $C_{1-20}$ hydrocarbyl iodide having one to ten iodine atoms per molecule. The hydrocarbyl portion of the organoiodide can be saturated or unsaturated aliphatic, cycloaliphatic, or aromatic, such as alkyl, alkenyl, cycloalkyl, cycloalkenyl, aryl, or any combination thereof, such as alkaryl or aralkyl. For example, the organoiodide can be an alkyl iodide such as iodomethane, diiodomethane, iodoform, carbon tetraiodide, ethyl iodide, n-propyl iodide, 1,1-diiodopropane, isopropyl iodide, tert-butyl iodide, hexaiodoethane, 2-iodooctane, 2,7-diiodo-10-methylpentadecane, or 1-iodoeicosane. The organoiodide can also be an alkenyl iodide, such as allyl iodide. The organoiodide can also be a cycloalkyl iodide, such as iodocyclohexane. The organoiodide can also be an aromatic iodide, such as iodobenzene, 1,4-diiodobenzene, 4-methyl-iodobenzene, or an iodine-substituted naphthalene, anthracene, or other polynuclear aromatic compound. The organoiodide can be a aralkyl iodide, for example benzyl iodide or 1,4-bis(2-iodoethyl)benzene. The organoiodide can also be substituted by other functional groups, such as other halogen, alcohol, ester, ether, nitrile, alkoxysilane, or combinations comprising one or more of these groups. For example, the cyanoalkyl iodide, such as iodoacetonitrile, 2-cyanopropyl iodide, or 2-iodo-2-methylpropionitrile. The organoiodide can also be 1-iodo-1-chloroethane, 2-hydroxyethyl 2-iodoisobutyrate, ethylene glycol bis(2-iodoisobutyrate), glycerol tris(2-iodoisobutyrate), 3-iodopropyltrimethoxysilane, or 6-(2-iodo-2-isobutyryl)hexyltriethoxysilane. Combinations comprising any one or more of the above organoiodides can also be used. In some embodiments, the organoiodide is iodoform or iodoacetonitrile. The amount of organoiodide used in the method can be 0.001 to 1 equivalent, specifically 0.0025 to 0.25, equivalent, based on the moles of ethylenically unsaturated monomer.

As mentioned above, an organoiodide is defined herein as a compound having a C—I bond. As such, some iodo compounds such as p-toluenesulfonyl iodide, which has a S—I bond, and $I_2$, are not organoiodides. Although they have C—I bonds, fluoro-iodo hydrocarbons, such as perfluoroiodo hydrocarbons, can be undesirable for use in the present method. Thus, the term "organoiodide" excludes hydrocarbons having C—F bonds.

Although an iodine salt is not necessary in the iodine transfer polymerization method to obtain a (meth)acrylic acid polymer with controlled number average molar mass, narrow molecular weight distribution, and high conversion, an iodide salt can serve to further narrow the molecular weight distribution. Thus in some embodiments, the iodine transfer polymerization is conducted in the further presence of an iodide salt. Any inorganic or organic cation can be used as the counterion in the iodide salt. The iodide salt can be, for example, an alkali metal salt, an alkaline earth metal salt, an ammonium salt, a quaternary ammonium salt, or a combination comprising at least one of the foregoing salts. In some embodiments, the iodide salt is lithium iodide, sodium iodide, potassium iodide, or ammonium iodide, or a combination comprising as least one of the foregoing iodide salts. In some embodiments, the iodide salt is sodium iodide.

Advantageously, the iodine transfer polymerization can be conducted over a broad range of temperatures and times. In some embodiments, the polymerization is conducted at 0 to 150° C. for 1 minute to 48 hours. The temperature can be, for example, greater than or equal to 20 or 30° C. and less than or equal to 100, 90, 80, or 70° C. The time can be, for example, greater than or equal to 3, 5, 10, 15, 30, or 60 minutes and less than or equal to 24, 12, 10, 8, 6, or 5 hours. Under some conditions, the iodine transfer polymerization can be conducted at relatively mild temperatures and short times, while still obtaining high conversions. For example, the iodine transfer polymerization can be conducted at 20 to 70° C. for 3 minutes to 5 hours.

Advantageously, the iodine transfer polymerization method can be conducted in an aqueous solvent. The use of water avoids the flammability and toxicity issues associated with many organic solvents, thereby providing a "green" polymerization method. The solvent can be a combination of water and a water-miscible organic solvent. Thus in some embodiments, the solvent is an aqueous solvent comprising 50 to 100 weight percent water, based on the total weight of the solvent. Within this range the aqueous solvent can be greater than or equal to 80, 90, 95, or 99 weight percent water and less than or equal to 100 weight percent water. In some embodiments, the aqueous solvent is 100 weight percent water.

Although the iodine transfer polymerization can be conducted with a solution of 1 to less than 100 weight percent of the ethylenically unsaturated monomer in water, based on the total weight of the ethylenically unsaturated monomer and water, it was determined that monomer concentrations of less than or equal to 50 weight percent in water provide the highest conversion, while still providing low $M_n$ and Đ. Thus in some embodiments, the ethylenically unsaturated monomer is present as a 15 to 50 weight percent solution in water, based on the total weight of the ethylenically unsaturated monomer and solvent.

Advantageously, the inventors have determined molar ratios of ethylenically unsaturated monomer comprising (meth)acrylic acid or salt thereof, radical polymerization initiator, and organoiodide, that provide predominantly linear (meth)acrylic acid polymer of low $M_n$ and Đ and with high monomer conversion. Thus in some embodiments, the method comprises iodine transfer polymerization of 4 to 200 equivalents of the ethylenically unsaturated monomer comprising (meth)acrylic acid or salt thereof, in the presence of 0.05 to 1 equivalent of radical polymerization initiator, and 1 equivalent of organoiodide. In some embodiments, the method comprises iodine transfer polymerization of 2 to 100 equivalents of (meth)acrylic acid and 2 to 100 equivalents of a salt of (meth)acrylic acid, in the presence of 0.05 to 1 equivalent of radical polymerization initiator, and 1 equivalent of organoiodide.

Advantageously, the (meth)acrylic acid polymer made by the method is predominantly linear, and has a number average molar mass ($M_n$) of 1 to 100 kg/mol and a molar mass dispersity (Đ) of 1 to 5, as measured by chloroform size exclusion chromatography against polystyrene (PS) standards. $M_n$ of the (meth)acrylic acid polymer is in the range 1 to 100 kg/mol. Within this range, the $M_n$ can be greater than or equal to 2, 3, 4, or 5 kg/mol and less than or equal to 75, 50, 40, 30, 25, 20, or 15 kg/mol. In some embodiments, $M_n$ is in the range of 1 to 50 kg/mol, or 1 to 25 kg/mol. Đ of the (meth)acrylic acid polymer is in the range of 1 to 5. Within this range, Đ can be greater than or equal to 1 and less than or equal to 5, 4, 3, 2.5, or 2. In some embodiments, Đ is 1 to 2.5, or 1 to 2.

The (meth)acrylic acid polymer made by the method is predominantly linear. As defined herein, "predominantly linear" means that the polymer has less than or equal to 5% branching, as calculated from $^{13}$C NMR data as described in the Examples section under "Materials and Methods". Within this range, the (meth)acrylic acid polymer can have less than or equal to 4, 3, 2, or 1% branching.

Advantageously, the method is suited for the preparation of P(AA-co-NaA). Thus in some embodiments, the method comprises iodine transfer polymerization of 2 to 100 equivalents of acrylic acid and 2 to 100 equivalents of sodium acrylate, both dissolved in water to form a 15 to 50 weight percent solution, based on the total weight of the acrylic acid, sodium acrylate, and water, in the presence of: 0.05 to 1 equivalent of an azo polymerization initiator; 1 equivalent of an organoiodide; and 0 to 3 equivalents of an iodide salt.

The (meth)acrylic acid polymers made by the above method can be purified and isolated in solid form by dialysis and lyophilization as described in the Examples section under "Purification and Methylation of PAA". However, as (meth)acrylic acid polymers are often used in aqueous compositions, such as water-based coatings, purification and isolation may not be necessary for commercial use. Thus, in some embodiments, a (meth)acrylic acid polymer solution is made by a method comprising iodine transfer polymerization of an ethylenically unsaturated monomer comprising (meth)acrylic acid, salt thereof, or combination thereof, in the presence of: a radical polymerization initiator; an organoiodide; and a solvent. All of the variations for the method described herein are likewise applicable to the (meth)acrylic acid polymer solution made by the method. In some embodiments, the (meth)acrylic acid polymer solution is made by iodine transfer polymerization of an ethylenically unsaturated monomer comprising (meth)acrylic acid, or salt thereof, in the presence of 0.05 to 1 equivalent of the azo polymerization initiator, 1 equivalent of the organoiodide, and 0 to 3 equivalents of an iodide salt, and a solvent. In some embodiments, the (meth)acrylic acid polymer solution is made by copolymerization of 2 to 200 equivalents of acrylic acid and 2 to 200 equivalents of sodium acrylate. In some embodiments of the (meth)acrylic acid polymer solution, the (meth)acrylic acid polymer is predominantly linear, and has a number average molar mass ($M_n$) of 1 to 100 kg/mol and a molar mass dispersity (Đ) of 1 to 5, as measured by chloroform size exclusion chromatography against polystyrene (PS) standards after methylation with trimethylsilyl diazomethane.

When the (meth)acrylic acid polymer solution is not purified, for example by dialysis, by-products of the polymerization can be present. Depending upon the specific reagents used, the (meth)acrylic acid polymer solution can contain inorganic species, for example, iodide ion, triodide ion, an alkali metal ion, an alkaline earth metal ion, or an ammonium ion. Organic compounds derived from reduction of organoiodide intermediates with hydrogen, for example acetonitrile from iodoacetonitrile, can be present. Organic compounds derived from the radical polymerization initiator can also be present, for example 4-methoxy-2,4-dimethyl-penanenitrile from decomposition of V70, 2-methylprioionitrile from decomposition of AIBN, and 4-cyanopentanoic acid from decomposition of V501. Organic compounds derived from substitution of (meth)acrylic acid for iodine in the organoiodides, for example the cyanomethyl ester of acrylic acid, from reaction of iodoacetonitrile with acrylic acid or sodium acrylate.

This disclosure is further illustrated by the following aspects, which are not intended to limit the claims.

Aspect 1. A method of making a (meth)acrylic acid polymer, comprising iodine transfer polymerization of an ethylenically unsaturated monomer comprising (meth)acrylic acid, salt thereof, or combination thereof, in the presence of: a radical polymerization initiator; an organoiodide; and a solvent.

Aspect 2. The method of aspect 1, wherein the ethylenically unsaturated monomer comprises a combination of (meth)acrylic acid and salt thereof.

Aspect 3. The method of aspect 1 or 2, wherein the salt is an alkali metal salt, an alkaline earth metal salt, an ammonium salt, a quaternary ammonium salt, or a combination comprising at least one of the foregoing salts.

Aspect 4. The method of any of aspects 1 to 3, wherein the ethylenically unsaturated monomer further comprises one or more other (meth)acrylic or vinyl monomers.

Aspect 5. The method of any of aspects 1 to 4, wherein the solvent is an aqueous solvent comprising 50 to 100 weight percent water, based on the total weight of the solvent.

Aspect 6. The method of any of aspects 1 to 5, wherein the radical polymerization initiator is an azo polymerization initiator.

Aspect 7. The method of any of aspects 1 to 6, wherein hydrocarbons having CF bonds are excluded from the organoiodide.

Aspect 8. The method of any of aspects 1 to 7, wherein the iodine transfer polymerization is conducted in the further presence of an iodide salt.

Aspect 9. The method of any of aspects 1 to 8, wherein the polymerization is conducted at 0 to 150° C. for 1 minute to 48 hours.

Aspect 10. The method of any of aspects 1 to 9, wherein the solvent comprises water, and the ethylenically unsaturated monomer is present as a 15 to 50 weight percent solution in the solvent, based on the total weight of the ethylenically unsaturated monomer and solvent.

Aspect 11. The method of any of aspects 1 to 10, comprising iodine transfer polymerization of 4 to 200 equivalents of the ethylenically unsaturated monomer comprising (meth)acrylic acid or salt thereof, in the presence of 0.05 to 1 equivalent of the radical polymerization initiator, and 1 equivalent of the organoiodide.

Aspect 12. The method of any of aspects 1 to 11, comprising iodine transfer polymerization of 2 to 100 equivalents of (meth)acrylic acid and 2 to 100 equivalents of a salt of (meth)acrylic acid, in the presence of 0.05 to 1 equivalent of the radical polymerization initiator, and 1 equivalent of the organoiodide.

Aspect 13. The method of any of aspects 1 to 12, wherein the (meth)acrylic acid polymer is predominantly linear, and has a number average molar mass ($M_n$) of 1 to 100 kg/mol and a molar mass dispersity of 1 to 5, as measured by chloroform size exclusion chromatography against polystyrene standards after methylation with trimethylsilyl diazomethane.

Aspect 14. A method of making a (meth)acrylic acid polymer, comprising iodine transfer polymerization of 2 to 100 equivalents of acrylic acid and 2 to 100 equivalents of sodium acrylate, both dissolved in water to form a 15 to 50 weight percent solution, based on the total weight of the acrylic acid, sodium acrylate, and water, in the presence of: 0.05 to 1 equivalent of an azo polymerization initiator; 1 equivalent of an organoiodide; and 0 to 3 equivalents of an iodide salt.

Aspect 15. A (meth)acrylic acid polymer solution made by the method of any of aspects 1 to 14.

Aspect 16. The (meth)acrylic acid polymer solution of a aspect 15, made by iodine transfer polymerization of an ethylenically unsaturated monomer comprising (meth)acrylic acid, or salt thereof, in the presence of 0.05 to 1 equivalent of the azo polymerization initiator, 1 equivalent of the organoiodide, and 0 to 3 equivalents of an iodide salt.

Aspect 17. The (meth)acrylic acid polymer solution of any of aspects 14 to 16, wherein the (meth)acrylic acid polymer solution is made by copolymerization of 2 to 200 equivalents of acrylic acid and 2 to 200 equivalents of sodium acrylate.

Aspect 18. The (meth)acrylic acid polymer solution of any of aspects 14 to 17, wherein the (meth)acrylic acid polymer is predominantly linear, and has a number average molar mass ($M_n$) of 1 to 100 kg/mol and a molar mass dispersity (Đ) of 1 to 5, as measured by chloroform size exclusion chromatography against polystyrene standards after methylation with trimethylsilyl diazomethane.

This disclosure is further illustrated by the following examples, which are not intended to limit the claims.

EXAMPLES

Materials and Methods

The materials used or mentioned herein are described in Table 1.

TABLE 1

Materials

| Short Name | Chemical Name | Source |
|---|---|---|
| AA | Acrylic acid, 99%, stabilized | Acros Organics |
| NaA | Sodium acrylate, 97% | Sigma Aldrich |
| PAA | Polyacrylic acid | Synthesized |
| P(AA-co-NaA) | Poly(acrylic acid-co-sodium acrylate) random copolymer | Synthesized |
| PMA | Poly(methyl acrylate) | Synthesized |
| PMMA | Poly(methyl methacrylate) | Agilent Technologies |
| Ar | Argon | Praxair |
| HCl | Hydrochloric acid | EMD Millipore Corporation |
| $CHCl_3$ | Chloroform | Fisher Scientific |
| $I_2$ | Iodine | Mentioned, not used |
| $CHI_3$ | Iodoform, 99% | Alfa Aesar |
| $ICH_2CN$ | Iodoacetonitrile, 97% | Alfa Aesar |
| NaI | Sodium iodide, 99% | Fisher Scientific or EMD Millipore |
| $(CH_3)_3SiCHN_2$ | Trimethylsilyl diazomethane, 2M solution in diethyl ether | Sigma Aldrich |
| V70 | 2,2'-Azobis(4-methoxy-2,4-dimethylpentanenitrile), 97% | Wako Chemicals USA |
| V501 | 4,4'-Azobis(4-cyanopentanoic acid) | Wako Chemicals USA |
| AIBN | 2,2'-Azobis(2-methylpropionitrile), 98% | Sigma Aldrich |
| $Na_2S_2O_8$ | Sodium persulfate, ≥99% | Sigma Aldrich |

TABLE 2

Abbreviations

| Abbreviation | Full Name |
|---|---|
| CTA | Chain transfer agent |
| ITP | Iodine transfer polymerization |
| Đ | Molar mass dispersity |
| $DP_n$ | Degree of polymerization, n is the number of monomer repeat units. |
| dRI | Differential refractive index (refractive index relative to solvent). |
| $M_n$ | Number average molar mass |
| MALLS | Multi-angle laser light scattering |
| MWCO | Molecular weight cut-off |
| NMR | Nuclear magnetic resonance |
| SEC | Size exclusion chromatography |
| t | Time |

Nuclear magnetic resonance (NMR) spectra were recorded on a Varian 400, 500 or 600 MHz spectrometer.

Number average molar mass ($M_n$) and molar mass dispersity (Đ) were measured by size exclusion chromatography (SEC) with water as the eluent against PAA standards (aqueous SEC) using a refractive index detector (Ex. 1-6 and 8-12). $M_n$ and Đ were also measured by aqueous SEC using a MALLS detector (Ex. 13-16). $M_n$ is reported in units of grams per mole (g/mol) or kilograms per mole (kg/mol). Đ is dimensionless.

$M_n$ and Đ were also measured by SEC on methylated polymers using a Waters 2690 separation module equipped with a Waters 2410 refractive index detector, with 0.25% trimethylamine in chloroform as eluent, against poly(methyl methacrylate) (PMMA) standards. SEC of methylated polymers was also measured using a Waters Acquity Advanced Polymer Characterization (APC) separation module equipped with an Acquity UPLC refractive index detector against polystyrene standards. Polymers were methylated with trimethylsilyl diazomethane according to the procedure below prior to chloroform SEC.

Branching was measured by $^{13}$C-NMR by the method described in Gaborieau, M., *Macromolecules*, 2017, 50, 9032. The percentage of AA repeat units that are branched is (DB) is calculated using Eq. 1.

$$DB\ (\%) = \frac{I(C_q) \times 100}{I(C_q) + \frac{I(CH + CH_2)}{2}} \quad (1)$$

Where $C_q$ are the quaternary (branching) carbon atoms, $I(C_q)$ is the integral of the $C_q$ signal and $I(CH+CH_2)$ is the integral of the signals of the backbone tertiary and secondary ($CH+CH_2$) carbon atoms present in all the repeat units. DB can also be calculated using Eq. 2.

$$DB\ (\%) = \frac{I(C_q) \times 100}{I(C=O)} \quad (2)$$

Where I(C=O) is the integral of the signals of all carbonyl groups present in the main polymer chain, excluding end groups. The two methods provide similar results.

Purification and Methylation of PAA

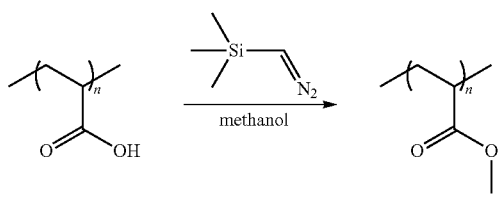

Crude PAA was diluted with deionized water, filtered through a 0.45-μm cellulose acetate membrane, and dialyzed against deionized water using cellulose ester dialysis tubing (SPECTRA/POR™ dialysis membrane having a MWCO of 100-500, obtained from Repligen Corp.) for 48 h. After lyophilization (freeze-drying), the PAA was isolated as a slightly yellow or white powder. Crude P(AA-co-NaA) was isolated in a similar manner, except it was dialyzed against 1.0 M aq HCl for 24 h to form PAA, and then against deionized water for 48 h.

The isolated polymer (PAA in both cases) was methylated using trimethylsilyl diazomethane, which solubilized it in organic solvents, according to a procedure published in Z. A. Page et al., *J. Polym. Sci. Part A: Polym. Chem.* 2016, 55, 801-807. To a 4-mL vial equipped with a magnetic stir bar were added 20.0 mg of purified polymer and 1.0 mL methanol. Trimethylsilyl diazomethane solution (1.0 mL of 2.0 M solution in diethyl ether) was added dropwise over 10 min at 0° C. Then, the solution was left stirring overnight at room temperature. Acetic acid was added to quench the unreacted trimethylsilyl diazomethane before removing all the solvent and most volatile organic residuals under reduced pressure. The methylated polymer (PMA) was then dissolved in chloroform for SEC analysis to determine $M_n$ and Đ.

Example 1. Iodine Transfer Polymerization of AA and NaA with Iodoacetonitrile as Molar Mass Regulator

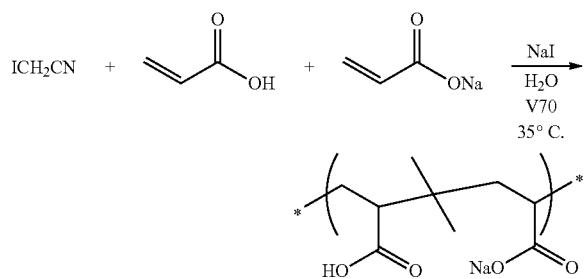

ITP of AA and NaA in water was carried out using ICH$_2$CN and NaI as molar mass regulators. The combination of AA and NaA was used to reduce the propagation rate. Using V70 as the radical polymerization initiator, the polymerization could be conducted at the low temperature of 35° C., which is intended to minimize any hydrolysis of the propagating alkyl iodide species during polymerization. The polymerization conditions were: AA/NaA/ICH$_2$CN/NaI/V70=30/30/1/1.5/0.25 equiv in water (33 wt %). The detailed procedure was as follows.

NaI (43.7 mg, 0.3 mmol, 1.5 equiv), deionized water (1.9 mL), NaA (548.1 mg, 5.8 mmol, 30.0 equiv) and AA (0.40 mL, 5.8 mmol, 30.0 equiv) were added sequentially to a 20-mL vial equipped with a stir bar. ICH$_2$CN (14.1 μL, 0.2 mmol, 1.0 equiv) and V70 (15.0 mg, 0.05 mmol, 0.25 equiv) were added and the vial was sealed with a septum cap. The polymerization solution was degassed by purging with Ar for 15 min. The vial was then transferred to a heating block and stirred at 35° C., and the polymerization was allowed to proceed for 21 h. After this time, the polymerization was stopped by opening the vial to expose the crude mixture to air. Two small aliquots (~10-30 μL) of the crude mixture were taken, for $^1$H-NMR analysis to determine percent conversion, and for SEC analysis to determine $M_n$ and Đ. The balance of the crude mixture was dialyzed against 1 M HCl (MWCO=100-500) for 24 h, and then against deionized water for 48 h. After lyophilization, 480 mg of PAA as a white powder was obtained (60% yield).

The $M_n$ of the crude (P(AA-co-NaA)) and purified (PAA) polymers was determined by aqueous SEC against PAA standards (12.6 kg/mol with a Đ of 2.8 for the purified sample). The SEC trace of the purified sample is reproduced in FIG. 1a. A sample of the crude PAA was methylated following the above procedure, and $M_n$ and Đ of the methylated polymer (PMA) were determined by SEC with chloroform as the eluent against PMMA standards as described above for verification. The $M_n$ and Đ of the methylated polymer were 12.5 kg/mol and 1.7, respectively. The SEC trace is reproduced in FIG. 1b for comparison.

Ex. 2-6. Control Experiments

The control experiments followed the general procedure of Ex. 1, with variations listed in the second column of Table 3.

TABLE 3

Summary of the Control Experiments

| Ex. | Conditions | Conversion | $M_n$ (g/mol) (Đ)[a] | $M_n$ (g/mol) (Đ)[b] | $M_n$ (g/mol) (Đ)[c] |
|---|---|---|---|---|---|
| 1 | AA, NaA, ICH$_2$CN, NaI, V70, water | 90% | 4400 (3.5) | 12,600 (2.8) | 12,500 (1.7) |
| 2 | No NaI | 95% | 5600 (3.6) | 12,000 (3.1) | 10,600 (2.0) |
| 3 | No ICH$_2$CN | gel | — | — | — |
| 4 | No V70 | <3% | — | — | — |
| 5 | No NaI/No ICH$_2$CN | gel | — | — | — |
| 6 | Monomers in water | gel | — | — | — |

[a] Crude sample (P(AA-co-NaA)), aq SEC against PAA standards.
[b] Purified sample (PAA), aq SEC against PAA standards.
[c] Methylated sample (PMA), CHCl$_3$ SEC against PMMA standards.

The control experiments confirmed the role of ICH$_2$CN as the molar mass regulator in controlling the molecular weight of P(AA-co-NaA), as all the polymerizations without the ICH$_2$CN led to gelation. The polymerization without NaI (Ex. 2) afforded a comparable monomer conversion (95%) as the polymerization with NaI (Ex. 1, 90%). However, the polymerization without NaI provided a slightly higher Đ as confirmed by both the aqueous and chloroform SEC results. This suggests NaI may also play a role in molar mass control. Ex. 4 indicated the need for a radical polymerization initiator when CTA is present. Ex. 6 illustrates the high reactivity of AA and NaA in the absence of radical polymerization initiator and CTA.

Ex. 7. Iodine Transfer Radical Polymerization of AA and NaA—Kinetics

Figure 2:
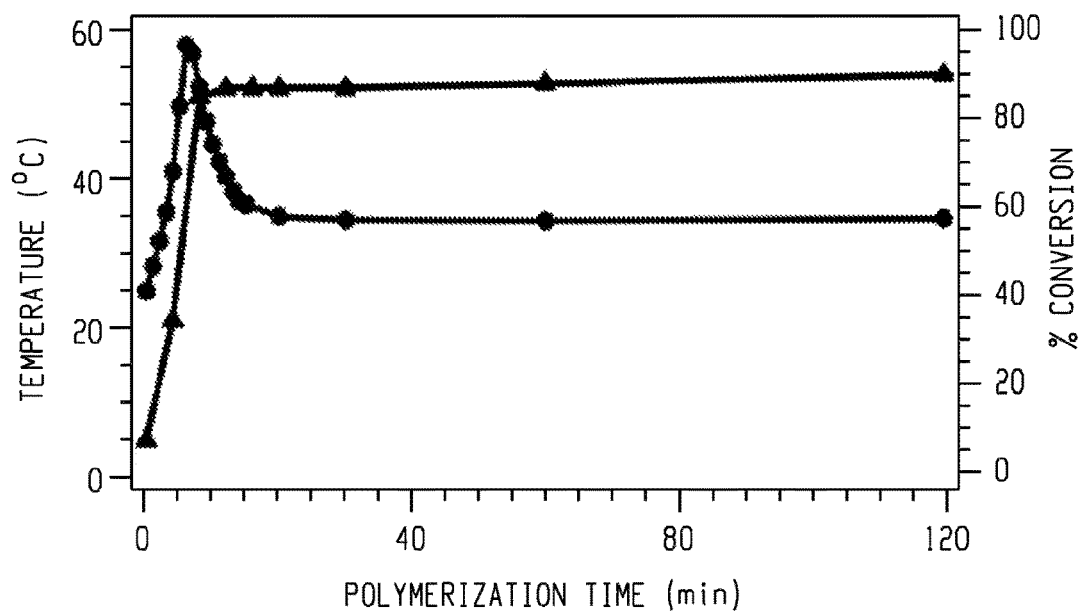
FIG. 2 is a plot of temperature (filled circles) and percent conversion (filled triangles) for ITP of AA and NaA according to Ex. 7 as a function of polymerization time.

ITP of AA and NaA is exothermic, with temperature increasing early in the polymerization. To investigate the extent of the temperature surge, as well as the rate of polymerization, a kinetic study of the polymerization under the same conditions as Ex. 1 was carried out. Both the reaction temperature and monomer conversion were monitored over the first two hours of the polymerization. The results are plotted in FIG. 2. As can be seen from FIG. 2, after placing the polymerization mixture in the heating block, which marked the beginning of the polymerization (t=0), the temperature rose to the set temperature of 35° C. in less than 5 min. The temperature continued to rise steadily beyond the set point and reached a maximum of 58° C. at t=6 min. The polymerization temperature then gradually cooled down to the set point temperature of 35° C. at t=20 min, and maintained at this set temperature for the rest of the polymerization. The conversion profile showed the polymerization proceeded rapidly at the beginning of the polymerization, with the monomer conversion reaching 85% in 8 min (right after the maximum reaction temperature was reached). The monomer conversion then plateaued at 90% in 2 h and 97% overnight (data not shown).

Ex. 8-12. Synthesis of P(AA-Co-NaA) of Various Molar Masses

To evaluate the effect of the molar mass regulator ($ICH_2CN$) on $M_n$, a series of polymerization experiments were conducted in which the monomer to $ICH_2CN$ ratio was varied to target different degrees of polymerization ($DP_{n,\,target}$=8, 15, 30, 60, and 90 in Ex. 8-12, respectively). The detailed procedure for Ex. 8 was as follows.

NaI (328 mg, 2.2 mmol, 1.5 equiv), deionized water (1.9 mL), NaA (548.1 mg, 5.8 mmol, 4.0 equiv) and AA (0.4 mL, 5.8 mmol, 4.0 equiv) were added sequentially to a 20-mL vial equipped with a stir bar. $ICH_2CN$ (105 µL, 1.5 mmol, 1.0 equiv) and V70 (112 mg, 0.4 mmol, 0.25 equiv) were added, and the vial was sealed with a septum cap. The polymerization solution was degassed by purging with Ar for 15 min. The vial was transferred to a heating block and stirred at 35° C., and polymerization was allowed to proceed for 20 h. Polymerization was stopped by opening the vial to expose the crude mixture to air. A small aliquot of the crude mixture was taken for $^1$H-NMR analysis to determine monomer conversion. The polymers were purified and methylated, and $M_n$ and Đ of the methylated PAAs were determined by chloroform SEC against PMMA standards, following the above procedures. The same procedure was followed for Ex. 9-12, except the monomer to $ICH_2CN$ ratio was varied as indicated in Table 4.

Figure 3:
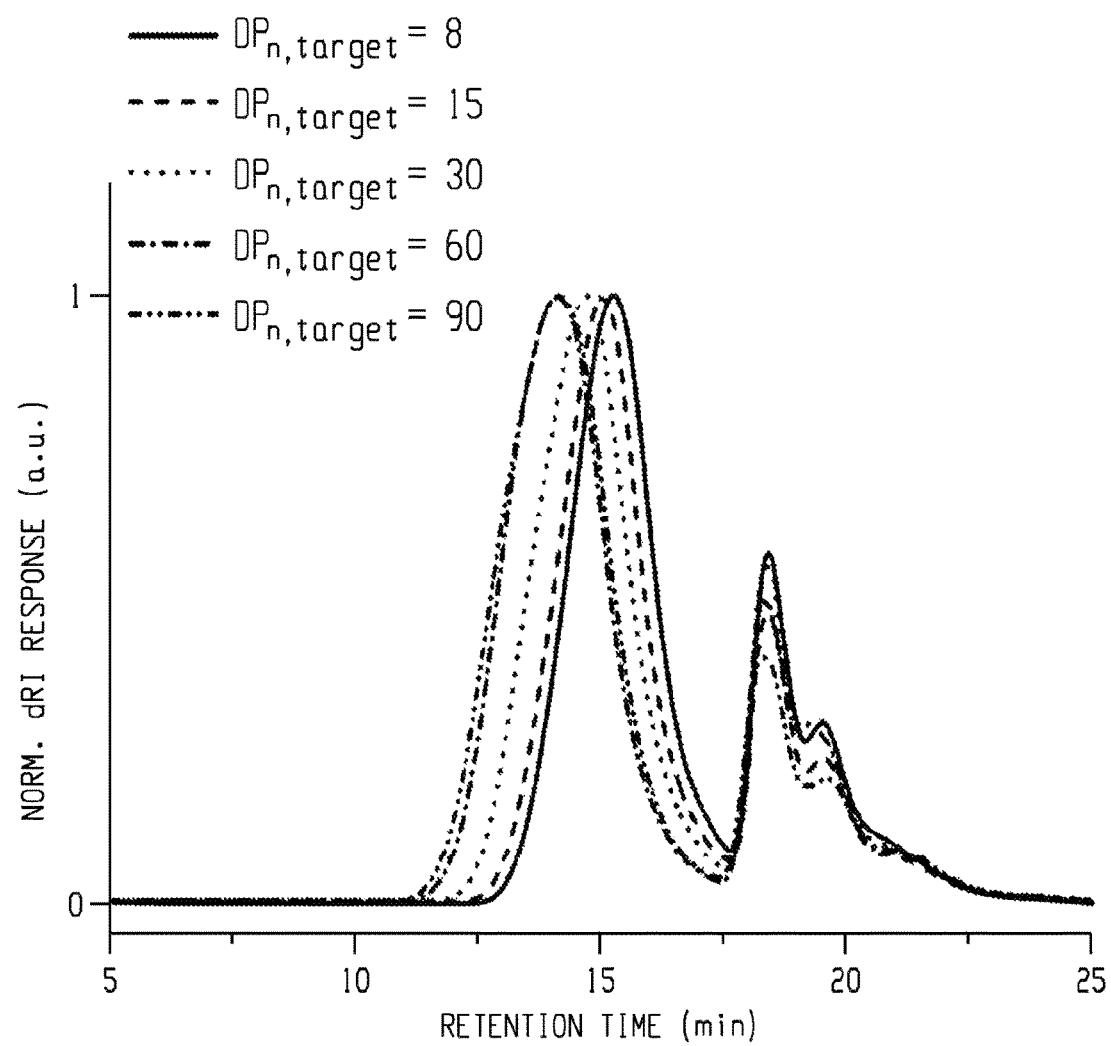
FIG. 3 depicts aqueous SEC traces of Ex. 8-12, which are purified P(AA-co-NaA)s of various target $DP_n$ values, in which $M_n$ and Đ were calculated based on PAA standards.
Figure 4:
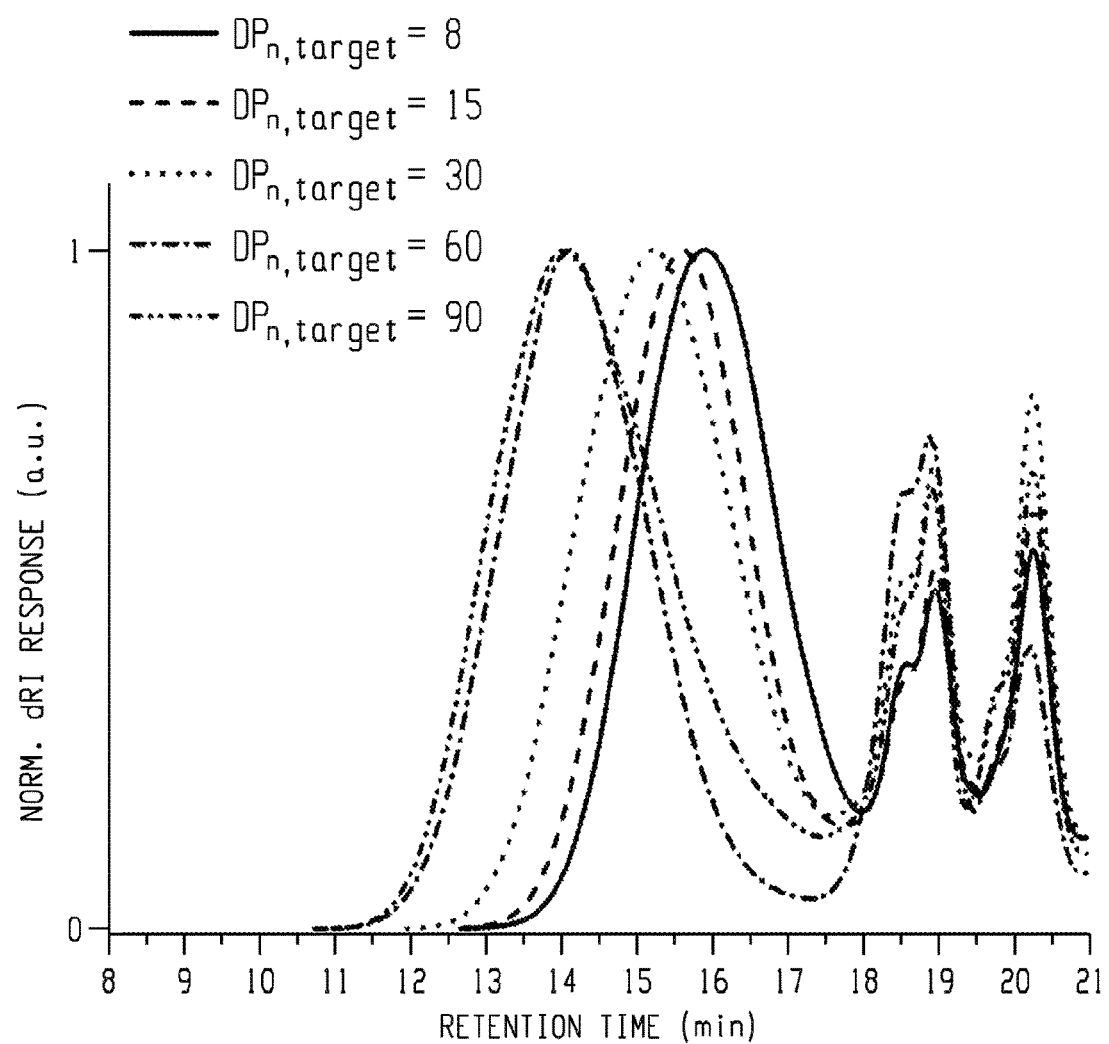
FIG. 4 depicts chloroform GPC traces of Ex. 8-12, which are purified P(AA-co-NaA)s of various target $DP_n$ values after methylation, in which $M_n$ and Đ were calculated based on PMMA standards.

The results are summarized in Table 4, FIG. 3 (aq SEC of P(AA-co-NaA), and FIG. 4 ($CHCl_3$ GPC of methylated P(AA)). $M_n$ was found to correlate with the target $DP_n$ values, with the $M_n$ for P(AA-co-NaA) ranging from 4.1 to 12.6 kg/mol, and the $M_n$ for methylated P(AA-co-NaA) ranging from 4.3 to 15.5 kg/mol. However, these molar masses are much higher than the theoretical values, which range from 0.7 to 6.7 kg/mol, calculated based on the target $DP_n$, suggesting a low chain transfer efficiency of the $ICH_2CN$. The high retention time peaks at about 18 to 21 min. in FIGS. 3 and 4 are due to residual organic impurities or side-products from the polymerization.

TABLE 4

Synthesis of P(AA-co-NaA) of Various Molar Masses

| Ex. | Target $DP_n$ | Monomer: $ICH_2CN$ | Conversion | $M_n$ (g/mol) (Đ)[a] | $M_n$ (g/mol) (Đ)[b] | $M_n$ (g/mol) (Đ)[c] |
|---|---|---|---|---|---|---|
| 8 | 8 | 8:1 | 94% | 2150 (2.3) | 4100 (2.1) | 4300 (1.7) |
| 9 | 15 | 15:1 | 93% | 2400 (2.4) | 5100 (2.1) | 6100 (1.6) |
| 10 | 30 | 30:1 | 95% | 3400 (2.5) | 7000 (2.5) | 8000 (1.7) |
| 11 | 60 | 60:1 | 90% | 4400 (3.5) | 12,600 (2.8) | 12,500 (1.7) |
| 12 | 90 | 90:1 | 94% | 5000 (3.6) | 12,000 (3.5) | 15,500 (1.9) |

[a] Crude sample (P(AA-co-NaA)), aq SEC against PAA standards.
[b] Purified sample (PAA), aq SEC against PAA standards.
[c] Methylated sample (PMA), $CHCl_3$ SEC against PMMA standards.

As can be seen from Table 4, P(AA-co-NaA) with approximately the same $M_n$ was obtained for both target $DP_n$=60 and target $DP_n$=90 (Ex. 11 and 12, respectively). Moreover, as can be seen from FIGS. 3 and 4, the SEC traces almost fully overlap.

Ex. 13. Iodine Transfer Copolymerization of AA and NaA, Scale-Up to Ten Grams In a 250-mL round bottom flask with a stir bar, AA (4.0 mL, 4.2 g, 5.8 mmol, 30 equiv), NaA (5.5 g, 5.8 mmol, 30 equiv), NaI (440 mg, 0.29 mmol, 1.5 equiv) and deionized water (19 mL) were sequentially added. $ICH_2CN$ (140 µL, 1.9 mmol, 1 equiv) was added and the flask was then sealed with a septum-cap. The polymerization solution was degassed by purging with Ar for 30 min, and V70 (150 mg, 0.50 mmol, 0.25 equiv) was then added under the Ar atmosphere. The flask was transferred to an oil bath and stirred at 35° C. for 22 h. The polymerization was stopped by exposing the polymerization mixture to air. Two small aliquots (~10-30 µL) of the polymerization mixture were taken for SEC and NMR analysis. At the end of polymerization (t=22 h), the reaction had reached a near-quantitative monomer conversion of 97% (data not shown), which was comparable to the conversion of the small scale synthesis of Ex. 1 and 8-12. The polymerization mixture was then lyophilized to give about 10 g of crude P(AA-co-NaA) as a white powder (99+% mass recovery). The $M_n$ of the crude P(AA-co-NaA) was 11.5 kg/mol, and the Đ was 1.7, which are comparable to the values for P(AA-co-NaA) made from the small-scale synthesis under identical polymerization conditions (Ex. 1, $M_n$=12.5 kg/mol, Đ=2.8).

Figure 5:
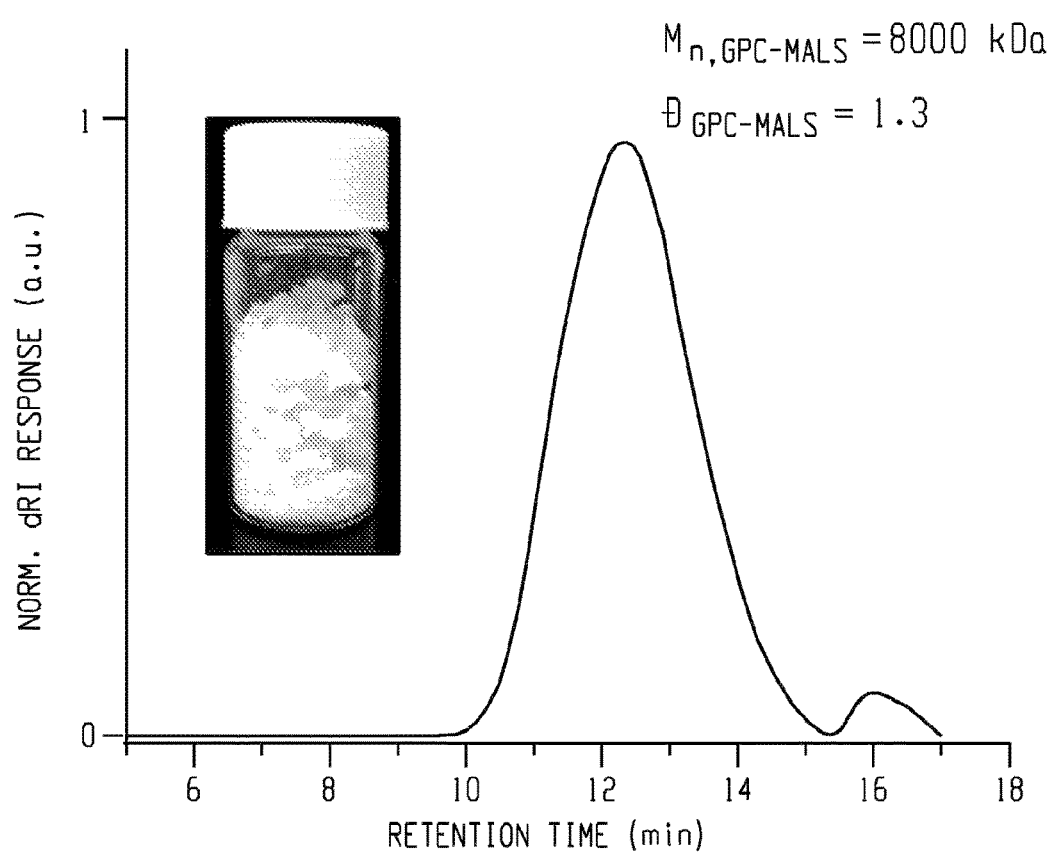
FIG. 5 depicts the aqueous SEC trace of purified P(AA-co-NaA) prepared on a 10-g scale (Ex. 13). $M_n$ and Đ were calculated based on MALS data against PAA standards. The inset is a photo of the P(AA-co-NaA) as a white powder.

To more accurately determine $M_n$, 10 mg of the crude polymer was first re-dissolved in deionized water, neutralized by dialysis against 1 M HCl and then water, and lyophilized. The purified P(AA-co-NaA) was then analyzed using aqueous SEC system equipped with a MALS detector. The $M_n$ of the purified P(AA-co-NaA) was 8 kg/mol, and the Đ was 1.3. The SEC trace is reproduced in FIG. 5. The shoulder at about 15 to 17 min is due to residual organic impurities or side-products from the polymerization.

This example demonstrates that ITP can be adapted for large-scale synthesis of PAA and derivatives, and provides high conversion and controlled molecular weight distributions (low Đ).

Ex. 14-16. Iodine Transfer Polymerization of AA and NaA with Other Radical Polymerization Initiators at Higher Temperatures The polymerizations of Ex. 1-13 were initiated with V70 at a set point of 35° C. Other polymerizations were conducted with AIBN at 70° C. (Ex. 14), with V501 at 70° C.

(Ex. 15), and with $Na_2S_2O_8$ at 80° C. $Na_2S_2O_8$ is a strong oxidant and can oxidize iodide anion (I⁻) into iodine ($I_2$). $I_2$ may inhibit radical polymerization by quenching propagating radical species. Therefore no NaI was added to Ex. 16, which employed $Na_2S_2O_8$ as the radical polymerization initiator. The results are summarized in Table 5. All the polymerizations initiated by azo initiators, which generate carbon-centered radicals, gave high monomer conversion after 22 h (≥97%). In contrast, the polymerization using $Na_2S_2O_8$, a peroxide initiator, which generates oxygen-centered radicals, gave a moderate monomer conversion of 54%, but the highest number average molar mass ($M_n$=9.0 kg/mol, Ð=1.5, using MALS detector) for the crude sample. The polymerizations initiated by azo radical initiators gave P(AA-co-NaA) with lower number average molar masses ($M_n$=6.3-7.8 kg/mol, using MALS detector) for the crude samples. Due to the loss of low molecular weight species during purification, the purified polymers from all polymerization experiments showed higher $M_n$ and lower Ð than the crude polymers. Ex. 13-16 show that ITP of AA and NaA can proceed at various temperatures using different radical polymerization initiators, while maintaining low $M_n$ and Ð.

TABLE 5

Iodine Transfer Polymerization of AA and NaA: Effect of Initiator and Temperature

| Ex. | Initiator | Temp (° C.) | Conversion | $M_n$ (g/mol) (Ð)[a] | $M_n$ (g/mol) (Ð)[b] | $M_n$ (g/mol) (Ð)[c] |
|---|---|---|---|---|---|---|
| 13 | V70 | 35 | 97% | 11,500 (1.7) | 7800 (1.5) | 8000 (1.3) |
| 14 | AIBN | 70 | >99% | 6600 (2.3) | 6300 (1.4) | 9700 (1.3) |
| 15 | V501 | 70 | >99% | 9300 (1.9) | 6300 (1.5) | 9000 (1.3) |
| 16 | $Na_2S_2O_8$[d] | 80 | 54% | 11,700 (1.8) | 9000 (1.5) | 12,000 (1.3) |

[a]Crude sample, aq SEC against PAA standards.
[b]Crude sample, aq SEC with MALS detector against PAA standards.
[c]Purified sample, aq SEC with MALS detector against PAA standards.
[d]No NaI.

The above examples demonstrate that ITP of AA using NaA as a comonomer, and $ICH_2CN$ and NaI as molar mass regulators, provides water-soluble P(AA-co-NaA) and derivatives having low $M_n$ and low Ð. Polymerizations carried out in the absence of $ICH_2CN$ (Ex. 3, 5, and 6) led to gelation, which demonstrates the role of $ICH_2CN$ as a CTA in molar mass control. The kinetic study (Ex. 7) showed that the polymerization was exothermic, and reached a monomer conversion of up to 85% within the first 10 minutes of the polymerization. The $M_n$ of the P(AA-co-NaA) was varied in Ex. 8-12 by changing the monomer to $ICH_2CN$ ratio. In this way, P(AA-co-NaA)s with $M_n$ ranging from 4.1 to 12.6 kg/mol were prepared. The scalability of the ITP of AA using NaA as a comonomer was demonstrated by a 10-g scale synthesis of P(AA-co-NaA) (Ex. 13, ten-fold increase in scale over Ex. 1). The P(AA-co-NaA) from Ex. 13 had comparable $M_n$ and Ð to the small-scale synthesis of P(AA-co-NaA) from Ex. 1. It was also found that ITP of AA and NaA can be performed at temperatures greater than 35° C. using radical polymerization initiators of higher decomposition temperatures such as AIBN, V501, and $Na_2S_2O_8$ (Ex. 14-16), while maintaining low $M_n$ and Ð.

Ex. 17. Iodine Transfer Radical Polymerization of AA with Iodoform as Molar Mass Regulator

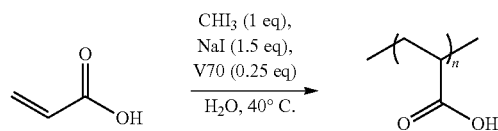

$CH_3I$ (76.6 mg, 0.2 mmol, 1.0 eq.), NaI (43.7 mg, 0.3 mmol, 1.5 eq.), V70 (15.0 mg, 0.05 mmol, 0.25 equiv), deionized water (90 μL) and acrylic acid (AA) (800 μL, 11.7 mmol, 60.0 equiv) were added to a 4-mL vial equipped with a stir bar, and the vial was sealed with a septum-cap. The reaction solution was degassed by purging with Ar for 10 min. Then, the vial was transferred to a heating block and stirred at 40° C. Polymerization was allowed to proceed for 16 h. After this time, the polymerization was stopped by opening the vial to expose the crude mixture to air. A small aliquot of the crude mixture was taken for ¹H-NMR analysis to determine monomer conversion. $M_n$ and Ð were measured by chloroform SEC against PMMA standards of methylated samples as described above. The results are summarized in Table 6.

Ex. 18-21. Iodine Transfer Polymerization of AA and NaA with Iodoform as Molar Mass Regulator—Effect of Monomer Concentration in Water Ex 18-21 followed the general procedure of Ex. 17, except for the weight percent of monomer in water. All polymerizations were conducted at 40° C. for 16-23 h, unless indicated otherwise. The results are summarized in Table 6. As can be seen from Table 6, the lower monomer concentrations of Ex. 19-21 (less than 80 wt %) provided higher conversion and higher $M_n$ than obtained with the higher monomer concentrations of Ex. 17 and 18 (90 and 80 wt %).

TABLE 6

Effect of Monomer Concentration in Water-High Concentrations

| Ex. | Monomer, wt % in Water | Conversion[a] | $M_n$ (g/mol)[b] | (Ð)[b] |
|---|---|---|---|---|
| 17 | 90 | 45% | 7800 | 1.6 |
| 18 | 80 | 40% | 4700 | 1.4 |
| 19 | 50 | 88% | 10,000 | 2.0 |
| 20 | 30 | >95% | 40,000 | 4.0 |
| 21[c] | 60 | 90% | 35,000 | 2.3 |

[a]By ¹H NMR analysis.
[b]Methylated sample, $CHCl_3$ SEC against PMMA standards.
[c]Room temperature polymerization of 1:1 AA:NaA.

Ex. 22-25. Iodine Transfer Radical Polymerization of AA and NaA with Iodoacetonitrile as Molar Mass Regulator—Effect of Monomer Concentration in Water NaI (87.0 mg, 0.6 mmol, 1.5 equiv), deionized water (1.9 mL), NaA (1.1 g, 11.7 mmol, 30.0 equiv) and AA (0.8 mL, 11.7 mmol, 30.0 equiv) were added sequentially to a 20-mL vial equipped with a stir bar. $ICH_2CN$ (28 μL, 0.4 mmol, 1.0 equiv) and V70 (30.0 mg, 0.1 mmol, 0.25 equiv) were added, and the vial was sealed with a septum-cap. The polymerization solution was degassed by purging with Ar for 15 min. A temperature probe was placed in the reaction solution to track the temperature during polymerization. The vial was transferred to a heating block and stirred at 35° C. The temperature was recorded every second, and aliquots were taken from the polymerization mixture for $^1$H-NMR analysis to determine monomer conversion. In The same polymerization procedure was followed in Ex. 23-25, except the monomer concentrations (AA plus NaA) in in water were 33, 25, and 15 wt %, respectively. The polymers were purified and methylated, and $M_n$ and Đ of the methylated PAAs were determined by chloroform SEC against PS standards, following the above procedures. The results are summarized in Table 7. As can be seen from Table 7, conversions ≥87%, high $M_n$, and low Đ were all obtained in the monomer concentration range of 15-50 wt %.

TABLE 7

Effect of Monomer Concentration in Water-Low Concentrations

| Ex. | Monomer, wt % in Water | Conversion[a] | $M_n$ (g/mol)[b] | (Đ) [b] |
|---|---|---|---|---|
| 22 | 50 | 90% | 14,000 | 1.64 |
| 23 | 33 | 87% | 11,000 | 1.84 |
| 24 | 25 | 88% | 18,000 | 1.48 |
| 25 | 15 | 94% | 12,000 | 1.94 |

[a]By $^1$H-NMR analysis.
[b]Methylated sample (PMA), CHCl$_3$ SEC against PS standards.

Ex. 26-29. Iodine Transfer Radical Polymerization of AA and NaA with Iodoacetonitrile as Molar Mass Regulator—Effect of Comonomer Ratio For Ex. 26, NaI (43.7 mg, 0.3 mmol, 1.5 equiv), deionized water (1.9 mL), NaA (548.1 mg, 5.8 mmol, 30.0 equiv) and AA (0.4 mL, 5.8 mmol, 30.0 equiv) were added sequentially to a 20-mL vial equipped with a stir bar. ICH$_2$CN (14.1 µL, 0.2 mmol, 1.0 equiv) and V70 (15.0 mg, 0.05 mmol, 0.25 equiv) were added, and the vial was sealed with a septum-cap. The polymerization solution was degassed by purging with Ar for 15 min. The vial was transferred to a heating block and stirred at 35° C. and the polymerization was allowed to proceed for 21 h. After this time the polymerization was stopped by opening the vial to expose the crude mixture to air. Samples were taken for $^1$H-NMR analysis to determine monomer conversion. The polymers were purified and methylated, and $M_n$ and Đ of the methylated PAAs were determined by chloroform SEC against polystyrene standards, following the above procedures. Ex. 27-29 were conducted at the same fixed total monomer (AA and NaA): ICH$_2$CN ratio of 60:1 as Ex. 26, but with variable relative amounts of AA and NaA in the monomer feed (70-90 mol % AA and 30-10 mol % NaA). The results are summarized in Table 8.

TABLE 8

Effect of Comonomer Ratio

| Ex. | AA Fraction (mol %) | Conversion[a] | $M_n$ (g/mol)[b] | (Đ) [b] |
|---|---|---|---|---|
| 26 | 50 | 90% | 12,000 | 1.7 |
| 27 | 70 | >95% | 14,000 | 2.2 |
| 28 | 80 | 85% | 27,000 | 2.0 |
| 29 | 90 | >95% | 25,000 | 2.3 |

[a]By $^1$H NMR analysis.
[b]Methylated sample (PMA), CHCl$_3$ SEC against PS standards.

As can be seen from Table 8, Ex. 27-29 all resulted in only minor broadening of the molar mass distributions (Đ=2.0-2.3) and increased $M_n$ (14,000-27,000 g/mol). These results clearly illustrate the viability of using different mole ratios of AA to NaA for rapid, low temperature preparation of PAA, and that a 50:50 mixture of AA and NaA provides the narrowest molar mass distribution (Đ=1.7).

Chemistry abbreviations used herein, but not otherwise identified, are those specified by the *Journal of Organic Chemistry Guideline for Authors*, updated April 2018. Other abbreviations used herein are identified in Table 1 (Materials) and Table 2 (Abbreviations).

As used herein, "organoiodide" excludes molecular iodine ($I_2$), sulfonyl iodides, such as p-toluenesulfonyl iodide, and hydrocarbons having C—F bonds.

As used herein, "polymer" can be a homopolymer or a copolymer, and "copolymer" is defined as a polymer composed of at least two different polymerized comonomers.

As used herein, the term "(meth)acrylic acid" denotes acrylic acid, methacrylic acid, or a combination of acrylic acid and methacrylic acid; and the term "(meth)acrylate" denotes acrylate, methacrylate, or a combination of acrylate and methacrylate.

The term "(meth)acrylic acid polymer" refers to polymerized forms of (meth)acrylic acid, i.e. poly(acrylic acid) and salts thereof and/or poly(methacrylic acid) and salts thereof. The term "(meth)acrylic acid polymer" also includes copolymers of acrylic acid and salts thereof, and/or methacrylic acid and salts thereof, with other (meth)acrylate monomers and/or vinyl monomers. The shorthand "PAA" refers to poly(acrylic acid), "PMAA" refers to poly(methacrylic acid), and "P(AA-co-NaA)" refers to a random copolymer of acrylic acid and sodium acrylate.

As used herein, the term "nonionic monomer" refers to ethylenically unsaturated monomers that are not ionized, i.e. they do not bear a charge, at pH 1 to 14.

A used herein a "salt" can be an alkali metal salt, an alkaline earth metal salt, an ammonium salt, or a quaternary ammonium salt. The salt can be, for example, a lithium salt, a sodium salt, a potassium salt, a calcium salt, or an ammonium salt. In some embodiments, the salt is a sodium salt.

As used herein, "combination thereof" and "combination comprising at least one of the foregoing" are inclusive of one or more of the recited elements, optionally together with a like element not recited.

The compositions, methods, and articles can alternatively comprise, consist of, or consist essentially of, any appropriate materials, steps, or components herein disclosed. The compositions and methods can additionally, or alternatively, be formulated so as to be devoid, or substantially free, of any materials (or species), steps, or components, that are otherwise not necessary to the achievement of the function or objective of the compositions and methods.

All ranges disclosed herein are inclusive of the endpoints, and the endpoints are independently combinable with each other (For example, "2, 4, 6, or 8 equivalents and less than or equal to 400, 300, 200, 100, or 90 equivalents", is inclusive of the endpoints and all intermediate values of the ranges, including for example, "4 to 200 equivalents" and "8 to 90 equivalents".)

"Combinations" is inclusive of blends, mixtures, alloys, reaction products, and the like. The terms "a" and "an" and "the" do not denote a limitation of quantity, and are to be construed to cover both the singular and the plural, unless otherwise indicated herein or clearly contradicted by context. "Or" means "and/or" unless clearly stated otherwise.

Reference throughout the specification to "some embodiments", "an embodiment", and so forth, means that a particular element described in connection with the embodiment is included in at least one embodiment described herein, and may or may not be present in other embodiments. In addition, it is to be understood that the described elements can be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed, and as they can be amended, are intended to embrace all such alternatives, modifications variations, improvements, and substantial equivalents.

The invention claimed is:

1. A method of making a (meth)acrylic acid polymer, comprising iodine transfer polymerization of 4 to 200 equivalents of an ethylenically unsaturated monomer comprising (meth)acrylic acid, salt thereof, or combination thereof, in the presence of:
   0.05 to 1 equivalent of a radical polymerization initiator;
   1 equivalent of an organoiodide; and
   an aqueous solvent comprising 50 to 100 weight percent water, based on the total weight of the solvent.

2. The method of claim 1, wherein the ethylenically unsaturated monomer comprises a combination of (meth)acrylic acid and salt thereof.

3. The method of claim 1, wherein the salt is an alkali metal salt, an alkaline earth metal salt, an ammonium salt, a quaternary ammonium salt, or a combination comprising at least one of the foregoing salts.

4. The method of claim 1, wherein the ethylenically unsaturated monomer further comprises one or more other (meth)acrylic or vinyl monomers.

5. The method of claim 1, wherein the radical polymerization initiator is an azo polymerization initiator.

6. The method of claim 1, wherein C—F bonds are excluded from the organoiodide.

7. The method of claim 1, wherein the iodine transfer polymerization is conducted in the further presence of an iodide salt.

8. The method of claim 1, wherein the polymerization is conducted at 0 to 150° C. for 1 minute to 48 hours.

9. The method of claim 1, wherein the ethylenically unsaturated monomer is present as a 15 to 50 weight percent solution in the aqueous solvent, based on the total weight of the ethylenically unsaturated monomer and solvent.

10. The method of claim 1, comprising iodine transfer polymerization of 2 to 100 equivalents of (meth)acrylic acid and 2 to 100 equivalents of a salt of (meth)acrylic acid, in the presence of 0.05 to 1 equivalent of the radical polymerization initiator, and 1 equivalent of the organoiodide.

11. The method of claim 1, wherein the (meth)acrylic acid polymer has less than or equal to 5% branching, and has a number average molar mass ($M_n$) of 1 to 100 kg/mol and a molar mass dispersity of 1 to 5, as measured by chloroform size exclusion chromatography against polystyrene standards after methylation with trimethylsilyl diazomethane.

12. A method of making a (meth)acrylic acid polymer, comprising iodine transfer polymerization of 2 to 100 equivalents of acrylic acid and 2 to 100 equivalents of sodium acrylate, both dissolved in water to form a 15 to 50 weight percent solution, based on the total weight of the acrylic acid, sodium acrylate, and water, in the presence of:
   0.05 to 1 equivalent of an azo polymerization initiator;
   1 equivalent of an organoiodide; and
   0 to 3 equivalents of an iodide salt.

13. The method of claim 1, wherein the ethylenically unsaturated monomer consists of acrylic acid, methacrylic acid, a salt thereof, or combinations thereof.

14. A (meth)acrylic acid polymer solution made by the method of claim 13, wherein the (meth)acrylic acid polymer has less than or equal to 5% branching, as calculated from $^{13}C$ data, and has a number average molar mass ($M_n$) of 1 to 100 kg/mol and a molar mass dispersity (Đ) of 1 to 5, as measured by chloroform size exclusion chromatography against polystyrene standards after methylation with trimethylsilyl diazomethane.

15. The (meth)acrylic acid polymer solution of claim 14, made by iodine transfer polymerization of an ethylenically unsaturated monomer comprising (meth)acrylic acid, or salt thereof, in the presence of 0.05 to 1 equivalent of the azo polymerization initiator, 1 equivalent of the organoiodide, and 0 to 3 equivalents of an iodide salt.

16. The (meth)acrylic acid polymer solution of claim 14, wherein the (meth)acrylic acid polymer solution is made by copolymerization of 2 to 200 equivalents of acrylic acid and 2 to 200 equivalents of sodium acrylate.

* * * * *